July 10, 1956

W. H. STAHL 2,754,057

REVERSE-FLOW INTEGRATING APPARATUS

Filed Nov. 8, 1951

INVENTOR.
William H. Stahl
By E. C. Sanborn
Attorney

July 10, 1956

W. H. STAHL 2,754,057

REVERSE-FLOW INTEGRATING APPARATUS

Filed Nov. 8, 1951

INVENTOR.
William H. Stahl
BY
E. C. Sanborn
Attorney

United States Patent Office 2,754,057
Patented July 10, 1956

2,754,057

REVERSE-FLOW INTEGRATING APPARATUS

William H. Stahl, Middlebury, Conn., assignor to The Bristol Company, Waterbury, Conn., a corporation of Connecticut Application November 8, 1951, Serial No. 255,493

5 Claims. (Cl. 235—61)

This invention relates to apparatus for integrating the flow of a fluid measured by means of the differential pressure developed between two points in a conduit through which said fluid is passing. More particularly, the invention is related to means for obtaining an integration of the total volume of measured fluid which has been transferred in a given direction through a conduit or the like wherein the flow may take place in either of two directions. In the measurement of fluid flow by means of an orifice, a Venturi tube, or other means for setting up a pressure differential representative of the rate of flow, it is customary to utilize a manometer type of instrument wherein such pressure differential acts to produce an angular deflection of a spindle, carrying a pointer, whose excursion from a fixed reference point thus becomes a measure of said rate of flow. Instruments of this type are well known in the art, and need not here be more fully described.

In the adaptation of meters of this class to integration, it is essential that there be provided a compensation for the inherent quadratic characteristic of the scale; and this result may be attained by a number of well-known expedients, depending upon the principle by which the integration is obtained. For example, as set forth in U. S. Letters Patent No. 2,088,568, issued to J. W. Beecher August 3, 1937, integration is accomplished by the periodic advance of a counting train as influenced by electrical signals derived from contacts controlled by a constantly rotating cam or scroll-plate associated with a pointer whose deflection is proportional to the pressure differential across an orifice in a pipe line in which flow is to be measured. In this form of flow meter, compensation for the non-linear proportionality existing between the deflection and the flow is effected by conforming the trailing edge of the cam to a square-root law, whereby the durations of successive impulses are made proportional to the then rates of flow through the pipe line or conduit.

It is an object of the present invention to provide means whereby to adapt the principle of developing electrical impulses or signals, having durations proportional to successive values of flow, to integration of said flow over specific periods of time, and with consideration of flow direction, whereby the registered measurement will represent the algebraic sum of units of flow transferred in a given direction past the location at which measurement is performed.

In carrying out the purposes of the invention it is proposed to provide an electric-motor-driven integrating train periodically actuated by impulses or signals derived from electric contacts having intervals of coaction depending upon the rate of flow during each signal, and to combine therewith means responsive to the direction of said flow and adapted correspondingly to affect the direction of advance of said train.

Figures 1, 2:
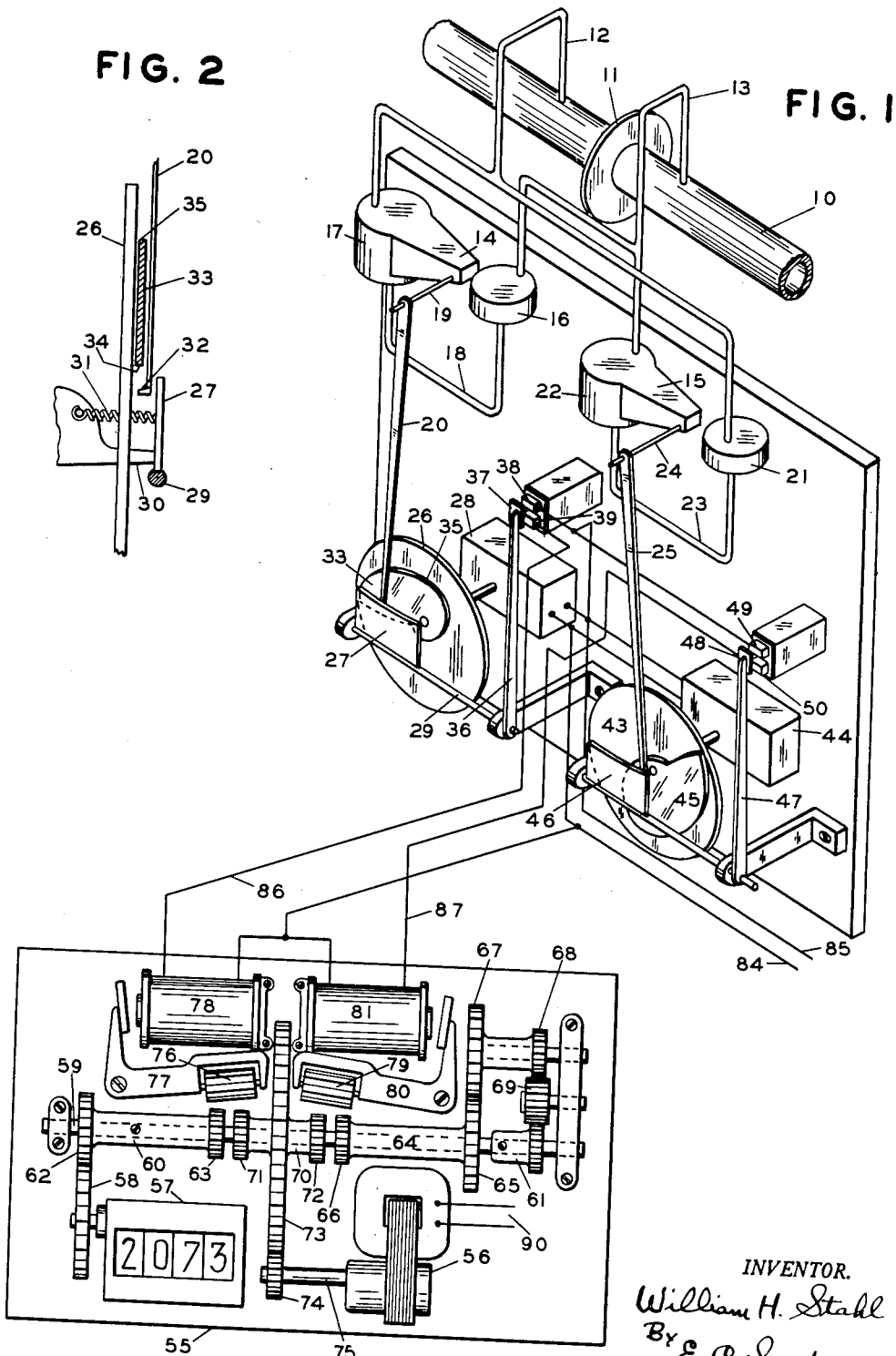
Fig. 1 is a representation, partly in perspective and partly in elevation, of a flow meter involving the principles of the invention, together with suitable electrical connections.
Fig. 2 is a detail side elevation of a portion of the mechanism of the apparatus shown in Fig. 1.

Referring to Fig. 1 of the drawings, the numeral 10 designates a pipe or conduit through which may flow in either direction a fluid whose net volume transfer in an given direction it is desired to integrate on a single register. Inserted in the pipe line is an orifice-plate 11 of well-known construction, and whereby the passage of fluid through the same causes to be developed axially of the orifice a pressure differential substantiallly proportional to the square of the rate of flow, which differential, through two conduits 12 and 13, respectively connected to the pipe line 10 on opposite sides of the orifice plate, is applied simultaneously to two manometer elements 14 and 15 of conventional type and identical proportions, but connected in relative opposition, so that, alternatively according to the direction of flow, one of the manometers will be operative while the other is held at its zero position.

The manometer 14 embodies two chambers 16 and 17 containing a heavy liquid such as mercury, and connected by a U-tube 18, whereby the pressure differential in the two chambers due to the flow of fluid in the pipe line 10 through the orifice-plate 11 produces a difference of level in the mercury surfaces in the two chambers. A spindle 19, actauted by a float (not shown) located within the chamber 17, carries an arm 20 deflecting to varying extents in accordance with the response of the manometer; and its position in the plane of deflection becomes a measure of flow through the pipe line 10, all of which is well understood as recognized practice in the measurement of flow in closed conduits.

The manometer 15 embodies two chambers 21 and 22, identical in general arrangement with chambers 16 and 17 comprising the manometer 14, said chambers 21 and 22 being connected by a U-tube 23, the whole containing mercury. Within the chamber 22 is a float adapted to actuate a spindle 24 carrying an arm 25, whereby pressure differential in the two chambers 21 and 22, producing a displacement of the body of mercury, causes the arm 25 to be deflected to varying extents in accordance with the flow through the pipe line 10, to which both manometers are connected. As is customary in the design and construction of manometers of the type set forth, the body of each includes stop means, not shown in the drawing, whereby upon the application of pressure differential in a sense opposite that of normal operation, the deflecting member of the instrument will be maintained at, or slightly below, its zero position, and its deflection will have no significance.

The hereinbefore mentioned opposition connection of the manometers 14 and 15 is effected by the conduit 12, which taps the pipe 10 to the left of the orifice plate 11, as seen in the drawing, being connected to the float-chamber 17 of the manometer 14 and to the reservoir chamber 21 of the manometer 15, while the conduit 13, tapping the pipe 10 to the right of the orifice plate, is connected to the float chamber 22 of the manometer 15 and to the reservoir chamber 16 of the manometer 14. Thus, with fluid flowing in the pipe 10 from right to left as seen in the drawing, the higher pressure will exist in the conduit 13, with the result that the manometer 14 will be operative and its pointer arm 20 will be deflected toward the left with increasing values of flow, while the pointer-arm 25 of the manometer 15 will be forcibly restrained to its lowest possible deflection. Similarly, fluid flow from left to right in the pipe 10, while depressing the pointer 20 of the manometer 14 to its lowest position, will cause the pointer 25 to be deflected toward the left, providing a corresponding measure of said flow.

The plane of deflection of the arm 20 is between a rotatable flat circular plate 26 to the rear and a flat rocker-plate 27 to the front, the path of deflection of the extremity of the arm being in a sense radial to the circular plate 26. The said plate 26 is carried on a centrally disposed shaft and is continuously rotated at a uniform velocity in a counterclockwise sense as seen in the drawing by a constant-speed motor 28, which may conveniently be a motor of the well-known "Telechron" type, with a suitable gear train to give the plate 26 an angular velocity of, for example, four revolutions per minute.

The rocker-plate 27 is fixed to an oscillatable shaft 29, free to swing through a small angle transversely of the plane of travel of the arm 20, and, as seen in Fig. 2, is normally held toward the plate 26 and against a stop 30 by a weak spring 31. Carried upon the extremity of the arm 20 is a rider 32, swinging freely with the arm 20 in the space normally provided between the plates 26 and 27 when the latter is resting against the stop 30. The rider 32, on its edge radially toward the spindle 19, has an inclined surface, and on its opposed face a surface perpendicular to the plane of deflection.

Affixed to the circular plate 26, and rotating therewith, is a flat scroll-plate 33 having a leading edge 34 and a spiral trailing edge 35. The leading edge 34 is conformed to an arc of substantially the same radius as the arm 20, and so positioned as to be concentric with the spindle 19 at the moment of engagement with the rider 32. Thus, as the scroll-plate rotates, the edge 34 will engage the rider 32 on its inclined surface, and lift it into engagement with the rockerplate 27, causing the latter to be deflected in a sense perpendicular to that of rotation of the scroll-plate and always at the same instant in the cycle of rotation of the scroll-plate, without regard to the deflected position of the arm 20 about the axis of the spindle 19. The trailing edge 35, over which the rider slips, allowing the rocker-plate 27 to be returned by the spring 31 to its normal position against the stop 30, is conformed to a spiral, the nature of which will hereinafter be set forth in more detail.

Attached to the shaft 29 is an arm 36, shown in Fig. 1, carrying on its extremity a circuit-controlling element 37 normally closing an electrical circuit at two contacts 38 and 39, and acting to open the circuit when the plate 27 is deflected by the scroll-plate member 33. Thus, as the scroll-plate 33 is continuously rotated with the plate 26, an electric circuit will be repeatedly closed and opened in definite cycles, as determined by the speed of the motor 28, the duration of each impulse so defined being dependent upon the angle subtended by the portion of the scroll-plate engaged by the rider 32.

Associated with the arm 25 is an electrical-impulse-controlling mechanism similar in every respect to that hereinabove described, and embodying a circular plate 43, continuously driven at a constant velocity by a motor 44, and carrying a scroll-plate 45 adapted to engage a rider carried upon the extremity of the arm 25, and, acting therethrough, to deflect a rocker-plate 46, actuating an arm 47 having on its extremity a circuit-controlling element 48, whereby contacts 49 and 50 are closed and opened in definite cycles and for time intervals dependent upon the angle subtended by the portion of the scroll-plate 45 engaged by the rider on the extremity of arm 25. As has hereinabove been pointed out, a linear proportionality between the durations of successive contact intervals and the flow values which they represent is obtained by the well-known expedient of conforming the trailing edge of each of the scroll-plates to a curve representing a square-root law. It will furthermore be apparent that should the measuring element be of a nature wherein the relationship between the measured magnitude and the resulting deflections is represented by some law other than a quadratic relationship, whether the characteristic curve be mathematically computable or empirical, the scroll-plates associated with the impulse-controlling elements may be correspondingly conformed, and a linear relation between measured magnitude and impulse-durations obtained.

Because the inherent function of the present invention involves taking cognizance of reversing flow directions, and because in the form now under consideration measurements of flow values having the respective directions are segregated in two independent manometer units, the respective scroll-plates 33 and 45 are conformed each to have a centrally located uninterrupted portion, so that when the corresponding pointer arm is deflected below the position representing zero pressure differential pressure in the associated manometer element, the rocker plate 27 or 46 as the case may be, is held in its outwardly deflected position, maintaining an open-circuit condition between the electrical contacts actuated thereby.

The integrator mechanism, through which electrical impulses determined by the contacts associated with the arms 36 and 47 are translated into terms of registration, and proportionately integrated, will now be described. A register 57 of conventional construction is mounted on a base plate 55, and is operable in either of opposite directions through a gear 58 which meshes with a gear 62 on a sleeve 60 secured to a shaft 59 which is journaled in bearings on said base plate. Journalled on said shaft 59 is a sleeve 70 carrying gears 71 and 72 at its opposite ends, and also carrying intermediate its ends a gear 73. The latter gear meshes with a gear 74 carried by the shaft 75 of a continuously running motor 56.

The aforementioned sleeve 60 carries a gear 63 at its end adjacent the gear 71, but motion will not be transmitted from the sleeve 70 to the shaft 59 by way of the gear 63 and sleeve 60 unless the gears 63 and 71 are engaged by an elongated gear element 76. The latter is carried on an arm 77 pivotally mounted on the base plate 55, and subject to actuation by an electromagnet 78, whereby, when said electromagnet is energized said elongated gear element is caused to mesh with both said gears 63 and 71, so that the same may rotate integrally, the result being equivalent to clutching the sleeve 70 to the shaft 59, whereby said sleeve and said shaft rotate as a unit in the same direction as that in which the sleeve 70 is driven by the motor 56.

Another sleeve 64, like the sleeve 70, is also journaled on the shaft 59. Said sleeve carries a gear 66 at its end adjacent the gear 72, and at its opposite end carries a gear 65, which, in turn, meshes with a gear 67 carried by an idler member suitably journaled on the base-plate 55. At its opposite end, said idler member carries a gear 68 which meshes with an idle gear 69, the latter, in turn, meshing with a gear 61 pinned to the shaft 59. The gear elements 68 and 61 are chosen to have a one to one ratio, as are also the gear elements 67 and 65. Thus, through the interposition of the idler 69 between the gears 68 and 61, the sleeve 64 and the shaft 59, upon which it runs freely, will tend to rotate in opposite directions, but at the same angular velocity.

Positioned adjacent gear elements 66 and 72 is an elongated gear element carried upon an arm 80 pivotally mounted upon the base-plate 55, and subject to actuation by an electromagnet 81, whereby, when said electromagnet is energized, said elongated gear element is caused to mesh with both gear elements 66 and 72, so that the same may rotate integrally. Rotation of the sleeve member 70 being imparted to the gear member 66, the shaft 59, as hereinbefore explained, will be caused to rotate at the same angular velocity as sleeve member 70 but in the opposite direction. Thus, the mechanism associated with the register 57 becomes in effect a reversing electromagnetically actuated clutch, wherein the counting elements of the register will be caused to rotate in a forward, or a backward, sense, and at the same speed in either direction, according to whether the electromagnet 78 or the electromagnet 81 is energized. The gear elements 76 and 79 are normally maintained out of mesh with their respectively associated gear elements by means of springs, not shown in the drawing, acting upon the respective arms 77 and 79 in opposition to the forces exerted due to excitation of the respective electromagnets.

The following are the electrical connections operatively interrelating the several elements of the apparatus: Of two conductors 84 and 85, forming the two sides of a suitable electrical supply circuit, conductor 84 is connected to one terminal of each of the motors 28 and 44 and to a common point of connection between one terminal of each of the electromagnets 78 and 81; and conductor 85 is connected to the remaining terminal of each of said motors and to the contact elements 38 and 49 of the switches controlled by the arms 36 and 47 respectively. The free terminal of magnet 78 is connected by means of a conductor 86 to the contact element 39, and the free terminal of magnet 81 by means of a conductor 87 to the contact element 50. The terminals of the integrator motor 56 are connected to a suitable source of supply 90, which, conveniently, though not necessarily, may be the same source as that supplying the conductors 84 and 85.

For the purpose of making clear the operation of the device, a "positive" direction of fluid flow in the conduit 10 may be considered as from right to left as seen in the diagram of Fig. 1. Assuming, first, a flow in this direction, it will be seen that the pressure in the conduit 13 will be in excess of that in the conduit 12, whence the manometer 15 will be forced to the lowest limit of its range, while the manometer 14 will be rendered operative to produce an angular deflection of its spindle 19 and pointer-arm 20 to an extent proportional to the difference of said pressures. Because the conformation of the scroll-plate 45, as hereinbefore pointed out, causes the rocker plate 46 and the contact arm 47 to be maintained in an open-circuit position so long as the manometer 15 tends toward a negative deflection, the electromagnet 81 in the integrating mechanism will remain de-energized, and the gear element 79 maintained out of engagement with the gears 66 and 72, whereby the latter gears are free for mutually independent rotation.

As the pointer-arm 20 is angularly displaced in response to differential pressures between the conduits 12 and 13 as measured by the manometer 14, the rocker plate 27 will be repeatedly deflected, so that the arm 20, acting through the contact 37 carried thereby will cause the contacts 38 and 39 to be repeatedly closed and opened in cyclic intervals of durations depending upon the displacement of said contact-arm 20. The magnet 78 in the integrator mechanism will thereby be repeatedly energized and de-energized, and will cause the gear element 76 to engage and disengage the gear elements 63 and 71, whereby the constant-speed motor 56, acting through the mechanical train so completed, will cause the register 57 to be advanced by increments representative of the relative intervals of engagement and disengagement of the scroll-plate associated with the arm 20, and therefore, of the flow as measured by the manometer 14. Thus, under the condition assumed, the register 57 will be caused to advance its registration by increments corresponding to measurements of flow in the positive sense.

It may now be assumed that the direction of flow in the conduit 10 is reversed, the fluid moving from left to right, or in a negative sense. The pressure in the conduit 12 will now be in excess of that in the conduit 13, whence the manometer 14 will be forced to the lowest point of its range, while the manometer 15 will be rendered operative to produce an angular deflection of its spindle 24 and pointer-arm 25 to an extent proportional to the difference of said pressures. For reasons hereinbefore stated in connection with the coaction of the scroll-plate 45 and the rocker-plate 46, the contact 37 will now be maintained in its open-circuit position with respect to the stationary contacts 38 and 39, the electromagnet 78 will remain de-energized and the gear element held out of engagement with the gears 63 and 71, leaving the latter gears free for mutually independent rotation. As the pointer-arm 25 is angularly displaced in response to differential pressures between the conduits 12 and 13, as measured by the manometer 15, the scroll-plate 45, coacting with said pointer-arm will react upon the rocker-plate 46, and thereby through the arm 47 and the movable contact 48, to open and close repeatedly the contacts 49–50 in a manner identical to that hereinbefore set forth for the contacts 37 and 38 when the manometer 14 is operative with flow in a positive sense in the conduit 10. The magnet 81 in the integrator mechanism, likewise operating in a manner similar to the corresponding magnet 78 in the other side of the mechanism, will cause the gear element 79 to engage and disengage the gear elements 66 and 72, which, due to the interposition of the idler 69, will cause the register 57 to be driven intermittently in a negative sense, and by an amount depending upon the degree of deflection of the arm 25, and hence upon the rate of negative flow in the conduit 10.

Thus, with positive flow being represented as a series of advacing increments upon the register 57, and negative flow as a series of increments in the reverse sense, the total displacement of the register over a selected interval of time will correspond to the algebraic sum of said increments, and therefore to the total transfer of fluid in a given direction through the conduit 10 in that interval.

Figure 3:
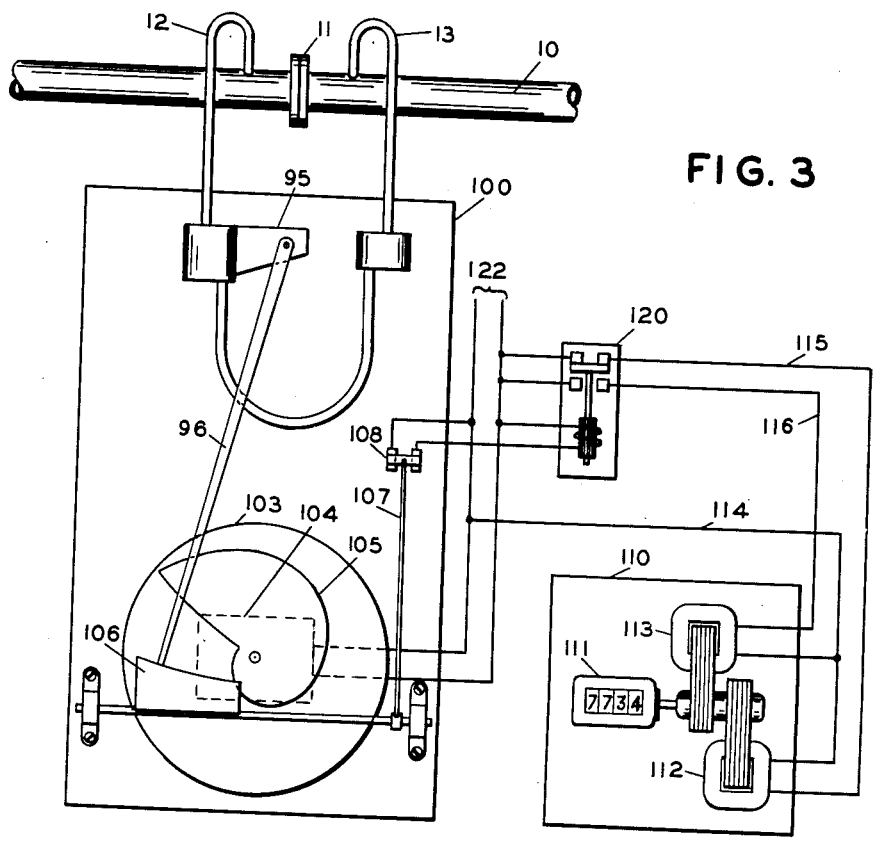
Fig. 3 is a representation of a form of the invention alternative to that shown in Fig. 1.

In Fig. 3 is shown an alternative form of the invention, wherein flow measurement in both directions is effected by a single manometer, and advance of the register of the integrating mechanism in one direction or the other is based upon the deviation of the manometer above or below a predetermined zero of reference established at a point between the extremities of the scale.

The conduit 10 wherein flows the fluid to be measured is, as hereinbefore set forth, provided with an orifice plate 11 and small conduits 12 and 13, whereby to transmit to a suitable differential pressure-responsive device the pressures existing on the two sides of said orifice-plate from the passage of fluid therethrough. The differential pressure between the conduits 12 and 13 is continuously measured by means of a manometer member 95, similar in general principle and construction to manometers 14 and 15 described in connection with Fig. 1, and provided with an extended pointer-arm 96 adjusted to assume a position intermediate the extremities of its possible excursion when the pressures in the conduits 12 and 13 are mutually equal, and to be deflected to the left or to the right of said position according to whether the pressure in the conduit 13 or in the conduit 12 is in excess of the other.

The above mentioned adjustment is accomplished by adjusting the position of the right-hand (high-pressure) chamber of the manometer somewhat above that of the left-hand (low-pressure) chamber. Thus, the mercury level in the latter chamber is raised so that the manometer float is permitted a full range of motion in the float chamber representing maximum positive to maximum negative pressure about a zero differential pressure position and thus to effect full range of movement of arm 96 in each direction from a mid position with respect to scroll plate 105.

The manometer member 95 is mounted on a baseplate 100, which carries also an impulse-producing mechanism or "transmitter" similar to those shown in Fig. 1, and embodying a circular plate 103 continuously driven at a constant velocity by a motor 104, and carrying a scroll-plate 105 adapted to engage a rider borne upon the extremity of the arm 96, and, acting therethrough, to deflect a rocker-plate 106, whereby to actuate an arm 107 and open and close electrical contacts 108 according to whether said pointer-arm is engaged by, or free from, the flat surface of the scroll-plate 105.

An integrator mechanism 110 includes a counting train or register 111, adapted to be driven in either direction by a reversible motor assembly, which, as shown, comprises two constant-speed electric motors 112 and 113, arranged to advance the register 111 in forward, and negative, senses respectively, and having a common conductor 114. The free terminals of the actuating windings of the motors 112 and 113 are connected to conductors 115 and 116 respectively. A relay member 120, of substantially instantaneous operating characteristics, is provided with contacts whereby to function as a single-pole double-throw switch, having one set of contacts interconnected, and its free contacts connected to the conductors 115 and 116 respectively. The interconnected contacts of the relay 120 and the common conductor 114 are connected to the respective sides of a suitable source of electric power 122, whereby the motor 112 or the motor 113 will be operatively energized according to whether the relay 120 is in an energized or a de-energized condition. Actuation of the relay 120 is effected from the source 122 in series with the contacts 108. While the motor 104, as well as the relay 120 and the motors in the integrator 110 are shown as all being energizable from the common source 122, this is a matter of expediency rather than of necessity; and, as will be obvious to those versed in the art, the operation of the apparatus will not be adversely affected should it be found desirable to operate the several components of the apparatus from mutually independent suitable sources of electric power.

The operation of the form of the invention shown in Fig. 3 is as follows: As the scroll-plate 105 is continuously rotated in a counter-clockwise sense as seen in the drawing, its leading edge will repeatedly engage the tip of the arm 96 and always at the same point in its cycle of rotation, whatever the position of said pointer in its path of excursion. Thus the rocker-plate 106 will be cyclically moved to a position to actuate the contact assembly 108 to open the circuit through which the relay 120 is energized. As rotation of the scroll-plate continues, the arm 96 will be disengaged, releasing the rocker-plate 106 and causing said contacts to close said circuit. Because of the spiral conformation of the trailing edge of the scroll-plate 105, the time in the cycle at which the contacts are closed, and therefore the duration of the interval between opening and closing, will be dependent upon the deflected position of the arm 96. Thus, the relative time of energization and deenergization of the relay 120 in each cycle of operation will be a measure of the rate of flow through the orifice-plate 11. The trailing edge of the scroll-plate being conformed to incorporate compensation for such non-linear relation as may exist between pressure differential and flow rate, the intervals of energization may be made directly proportional to the corresponding rates of flow. The manometer 95 being adjustable as hereinbefore set forth, to have a "zero" position intermediate the extremities of its range, this setting is made such that with zero flow through the orifice-plate 11 the pointer will assume a position to develop equal intervals of engagement and disengagement by the scroll-plate during each cycle of operation. Thus, the relay 120 will be energized and de-energized for equal intervals, and the motors 112 and 113 will be alternately energized, whereby to cause the register 111 in the integrator mechanism to rotate alternately forward and backward through equal increments, and with a resultant zero net change in the registration.

If it be assumed that the flow in the conduit 10 be in a "positive" sense, or from right to left as seen in the drawing, it will be seen that the pressure in the conduit 13 will be in excess of that in the conduit 12, so that the pointer-arm of the manometer 95 will be deflected toward the left of its zero position. Thus, the intervals of its engagement with the scroll-plate will be less than those of disengagement, with the result that in each cycle the contacts 108 will be opened for a shorter interval than they are closed. Consequently the relay 120 will be correspondingly de-energized for a shorter interval in each cycle than it will be energized, and the motor 112 will be operated for longer intervals than the motor 113. The register 111 will therefore be advanced in each cycle to a greater degree than it is set back, and the reading will progressively increase as the effects of successive cycles are superimposed. In a similar manner, if the flow is from left to right ni the conduit 10, the pointer-arm 96 will be deflected to the right of its zero position, with a corresponding predominance of operation of the motor 113 over the motor 112, and a concomitant progressive advance of the register 111 in a negative sense, thereby deducting from any previous through the conduit 10. Thus, over extended periods of time, the net registration of the integrator will be representative of the algebraic sum of all components of flow through the conduit 10.

Figure 4:
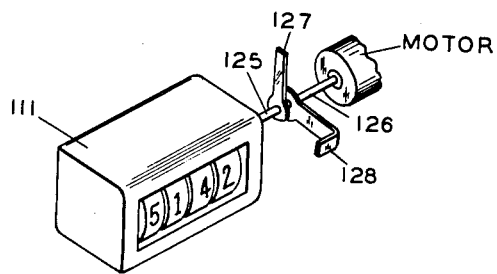
Fig. 4 illustrates a mechanical detail applicable to the form of the invention shown in Fig. 3.

Since the operation of the form of the invention shown in Fig. 3 will be characterized by an oscillatory motion of the shaft connecting the register 111 to the driving motors, it will be apparent that the mechanism of the register will normally partake of the same motion, with the resulting possibility that in some ranges the lowest (usually the right-hand) wheel will continually move back and forth as it seeks a position corresponding to the algebraic sum of the successive increments of movement. Should this characteristic prove objectionable it may be eliminated by the use of a lost-motion element as indicated in Fig. 4. Instead of the register 111 being directly connected to the rotor shaft, the latter is separated into two coaxial portions 125 and 126, attached to the register mechanism and to the motor respectively. The shaft portion 125 carries a lever 127, and the shaft portion 126 carries a dog 128 having a projecting lug adapted to engage the lever 127 and impart motion thereto. Said lever and dog, together with associated mechanical parts, are so proportioned that the dog may rotate freely without engaging the lever, through an angle representing the total increment of rotation imparted to the motor shaft during half a single revolution of the scroll-plate 105. Thus, assuming first a zero value of flow through the conduit 10, when the arm 96 will rest in its mid-position, and the motors 112 and 113 will rotate alternately in opposite senses, the dog 128 will have an oscillatory motion, swinging from a position where it just touches one side of the lever 127 to a position where it engages the other side of the same. Under this condition, the lever 127 will not be moved in either direction, and the counting train of the register 111 will remain at rest.

It may now be assumed that in response to a movement of fluid through the conduit 10 the arm 96 has become deflected from its zero position intermediate the extremities of its range, with the result, as hereinbefore set forth, that successive impulses representing open-circuit and closed-circuit conditions respectively at the contacts 108 will be of unequal duration, so that the oscillatory rotations of the shaft 126 will consistently be greater in one sense than the opposite. With each of the longer excursions of the dog 128, the lever 127 will be advanced through an angle representing the excess of that deflection over the deflection in the opposite sense, so that, instead of the register mechanism partaking of the oscillatory motion it will be advanced by a series of increments, whose total will represent the difference of the impulse in opposite directions, and hence the algebraic sum of corresponding increments of flow in the conduit 10.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for integrating reversible flow in a conduit with discrimination between possible directions of said flow, said apparatus comprising a flow-constricting element constituting a section of said conduit, manometer means having permanent tubular connection to said constricting element and including movable means positionable within an angle of less than 360° in accordance with the sense and intensity of differential pressure developed across said constricting element by said flow, electric circuit means and circuit controlling means therefor, cyclically operable means adapted to coact with said movable manometer means to actuate said circuit controlling means to establish in said circuit means recurrent electrical impulses of durations dependent upon successive positions of said movable means corresponding to flow rates in said directions, a reversible mechanical register having electrical controlling means subject to said circuit means and responsive to said impulses to advance said register by increments corresponding to the durations of said impulses and in a sense dependent upon the direction of displacement of said movable means from a predetermined setting.

2. Apparatus for integrating a reversible flow of fluid in a conduit with discrimination between directions of said flow to obtain the total net flow in one direction, said apparatus comprising a reversible mechanical register, means for actuating said register, manometer means, means comprising a pair of continuously open tubular connections between said manometer means and said conduit for rendering said manometer means responsive to rates of flow in said conduit in different directions, means controlled by said manometer means and positionable within an angle of less than 360°, means cooperating with said controlled means to produce in successive uniform time-cycles electrical impulses dependent upon the direction of said flow and of durations corresponding to the rates of said flow, and relay means responsive to said impulses for controlling the direction and extent of actuation of said register by said actuating means.

3. Apparatus for integrating a reversible flow of fluid in a conduit with discrimination between directions of said flow to obtain the total net flow in one direction, said apparatus comprising a reversible mechanical register, means for actuating said register, manometer means responsive to the differential pressure incident to said fluid flow, tubular means connecting said manometer means to said conduit and continuously open irrespective of the direction of flow of fluids in said conduit, means controlled by said manometer means and positionable within an angle of less than 360°, means cooperating with said controlled means to produce in successive uniform time-cycles electrical impulses dependent upon the direction of said flow and of durations corresponding to the rates of said flow, and means controlled by said signals for controlling the direction and extent of actuation of said register by said actuating means.

4. Apparatus for integrating a reversible flow of fluid in a conduit with discrimination between directions of said flow to obtain the total net flow in one direction, said apparatus comprising a reversible mechanical register, means for actuating said register, a manometer responsive to the differential pressure incident to flow of said fluid in one direction, means controlled by said manometer for producing a series of electrical impulses of durations corresponding to the rates of flow of said fluid in said direction, a manometer responsive to the differential pressure incident to flow of said fluid in the opposite direction, means controlled by the last mentioned manometer for producing another series of electrical impulses of durations corresponding to the rates of flow of said fluid in said opposite direction, tubular means continuously connecting said manometers to said conduit irrespective of the direction of flow of fluid therein, and means controlled by the impulses of the respective series for controlling the direction and extent of operation of said register by said actuating means.

5. Apparatus for integrating a reversible flow of fluid in a conduit with discrimination between directions of said flow to obtain the total net flow in one direction, said apparatus comprising a reversible mechanical register, means for actuating said register, a manometer responsive to the differential pressure incident to flow of said fluid in either of opposite directions, constantly-open connecting means between said manometer and said conduit for continuously subjecting said manometer to the differential pressure in said conduit, means controlled by said manometer means and positionable within an angle of less than 360°, means cooperating with said controlled means for producing a series of electrical impulses of durations representative of rates of flow of said fluid during flow of said fluid in one direction and for producing another series of electrical impulses of durations representative of rates of flow of said fluid during flow thereof in the opposite direction, and means controlled by the impulses of the respective series for determining the direction and extent of operation of said register by said actuating mechanism.

References Cited in the file of this patent

UNITED STATES PATENTS

| | | |
|---|---|---|
| 1,700,027 | Connet | Jan. 22, 1929 |
| 2,088,568 | Beecher | Aug. 3, 1937 |
| 2,207,908 | Beecher | July 16, 1940 |
| 2,302,458 | Miner | Nov. 17, 1942 |
| 2,390,613 | Oliphant | Dec. 11, 1945 |
| 2,428,770 | Albert | Oct. 14, 1947 |
| 2,437,178 | Wharton | Mar. 2, 1948 |

FOREIGN PATENTS

| | | |
|---|---|---|
| 679,899 | Germany | July 27, 1939 |